UNITED STATES PATENT OFFICE.

ALFRED R. PICKER, OF ST. LOUIS, MISSOURI, ASSIGNOR TO DURLACQUE MANUFACTURING COMPANY, OF ST. LOUIS, MISSOURI, A CORPORATION OF MISSOURI.

LIQUID COATING COMPOSITION.

1,196,276.　　　　Specification of Letters Patent.　　Patented Aug. 29, 1916.

No Drawing.　　Application filed June 26, 1914.　Serial No. 847,364.

*To all whom it may concern:*

Be it known that I, ALFRED R. PICKER, a citizen of the United States, and a resident of the city of St. Louis and State of Missouri, have invented a new and useful Liquid Coating Composition, of which the following is a specification.

The principal object of my invention is to produce a composition of matter having acid-resisting qualities whereby it is adapted for protecting metals during the operation of etching and whereby it is also adapted for the stiffening of the box toes of shoes.

The invention consists particularly in a solution of Pontianak gum copal and shellac in a volatile solvent, either with or without whiting added thereto.

In the preparation of my composition, Pontianak gum copal and shellac are mixed together, preferably in their commercial form, and are dissolved in alcohol and benzol. The proportions are preferably ninety pounds of copal, ten pounds of shellac, fourteen gallons of alcohol and six gallons of benzol. These proportions admit of considerable variation, as will be apparent from the following considerations: Pontianak gum copal has the desirable qualities of resisting the ordinary etching acids and perspiration; it is, however, too brittle to be used alone for the purpose contemplated by the present invention. The addition of shellac contributes the required flexibility; and the proportion of shellac above specified may be doubled or halved according to the degree of flexibility required of the final product. Red gum is a fairly good substitute for shellac.

The function of the alcohol and benzol is to dissolve the copal and shellac into a convenient form for use. These solvents should be used not merely in quantities sufficient to effect solution but sufficient to give the degree of liquidity best suited for the application of the composition. Both of these solvents are volatile and evaporate when the composition is applied.

After the copal and shellac are dissolved, the composition is strained to eliminate dirt and insoluble matter therefrom. The resulting composition is ready for use, particularly for use for coating metals that are to be etched. When the composition is to be used as a protection against etching acids, it is best to add thereto some spirit soluble anilin such as nigrosin, as the progress of the etching can thereby be better observed.

One of the most important uses of the composition is in the stiffening of box toes for shoes. When the composition is to be used for this purpose, whiting is added thereto. The preferable proportion of whiting is from three to four times the weight of the copal used. The whiting serves to make the preparation dry out faster and to make it pasty so as to spread better and go farther. When the box toe that is to be stiffened is made of felt or like material, a smaller proportion of whiting is used in order that the preparation may better penetrate such felt or like material. With such materials as leather, buckram, and the like, a greater quantity of whiting should be used in order that the dried coating may have a heavier body. Instead of whiting, barytes or the like may be substituted.

When the composition containing whiting is used for stiffening box toes, the felt or other material is coated or saturated therewith and suitably shaped. The alcohol and benzol quickly evaporate and the felt or like material is left as a stiff box toe having the necessary amount of flexibility and proof against perspiration.

What I claim as my invention is:

1. A composition of matter comprising Pontianak gum copal and shellac in substantially the proportions specified, dissolved in a volatile solvent thereof.

2. A composition of matter comprising the following ingredients in substantially the following proportions: Pontianak gum copal, about ninety pounds; shellac, ten pounds; alcohol, fourteen gallons; and benzol, six gallons.

3. A composition of matter comprising Pontianak gum copal and shellac dissolved in alcohol and benzol and whiting in substantially the proportions specified.

Signed at St. Louis, Missouri, this 24th day of June, 1914.

ALFRED R. PICKER.

Witnesses:
　JESSIE PALMER,
　M. A. SHELTON.